Dec. 8, 1931. V. E. FLODIN 1,835,289
GATE VALVE
Original Filed April 9, 1928  4 Sheets-Sheet 1
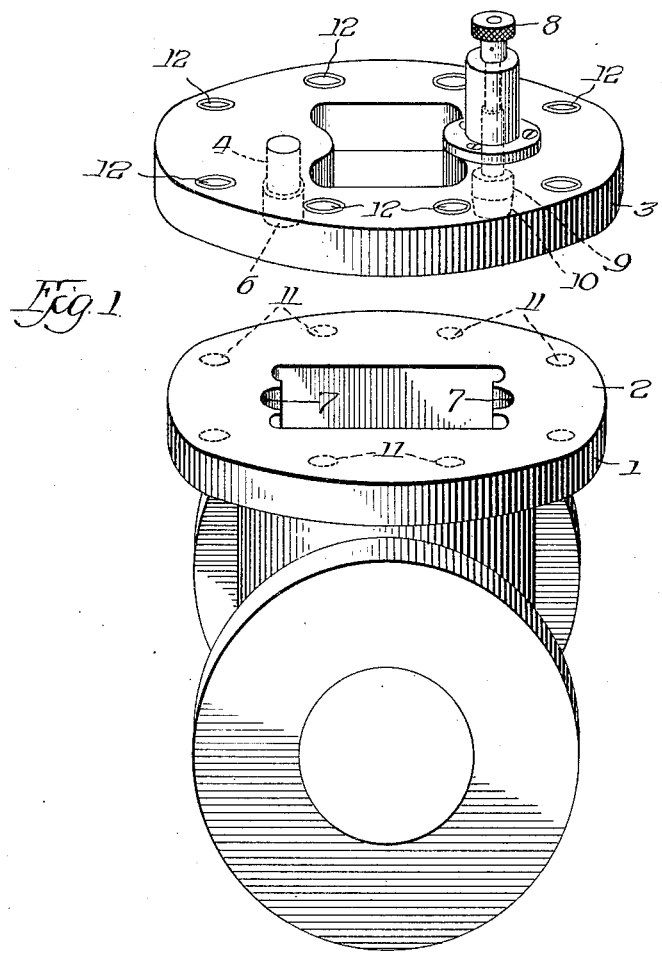
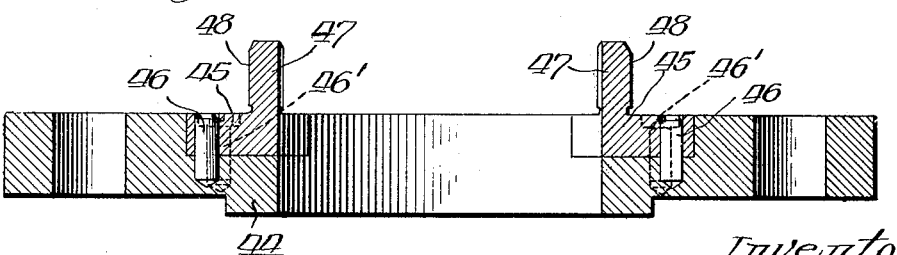

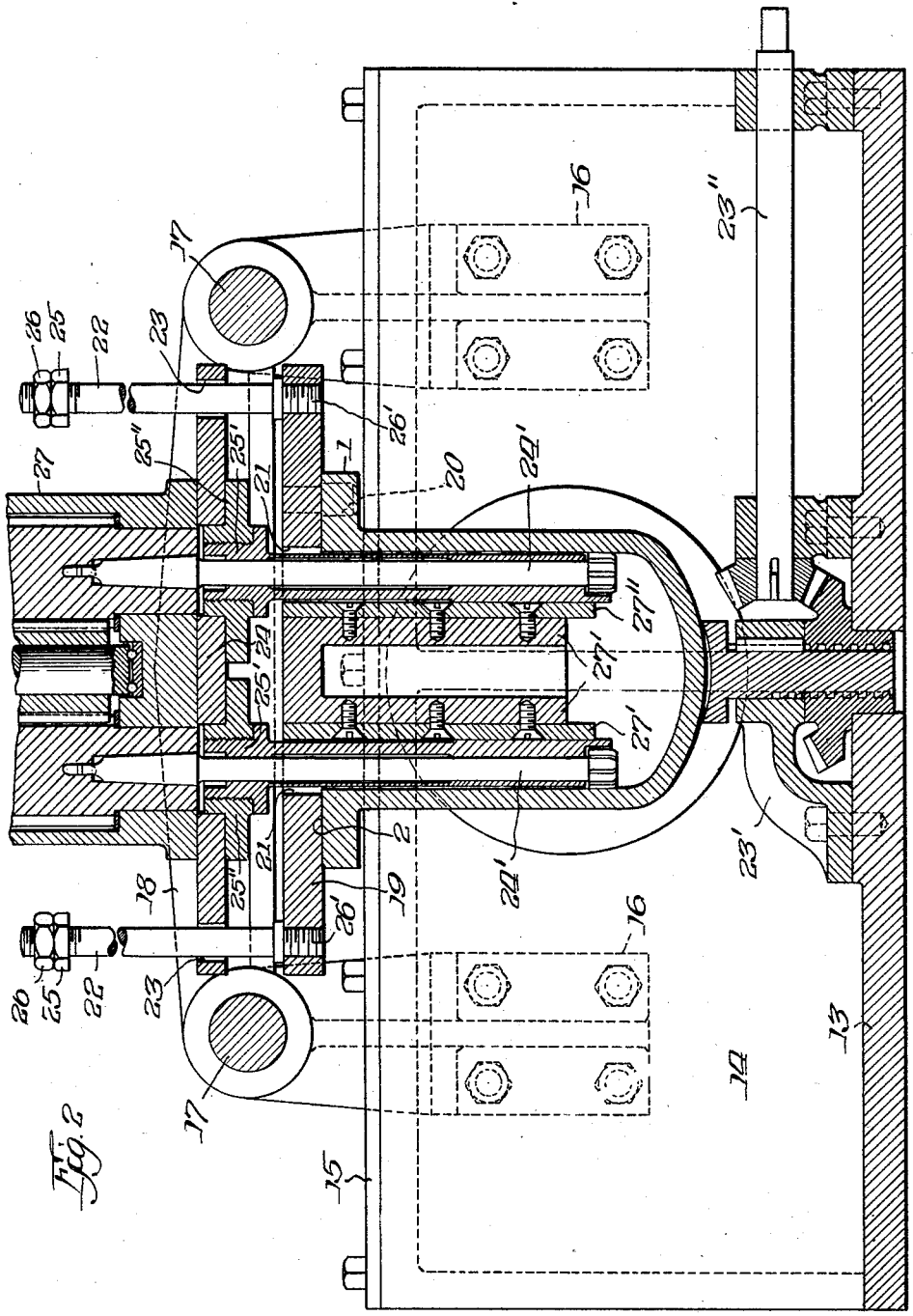

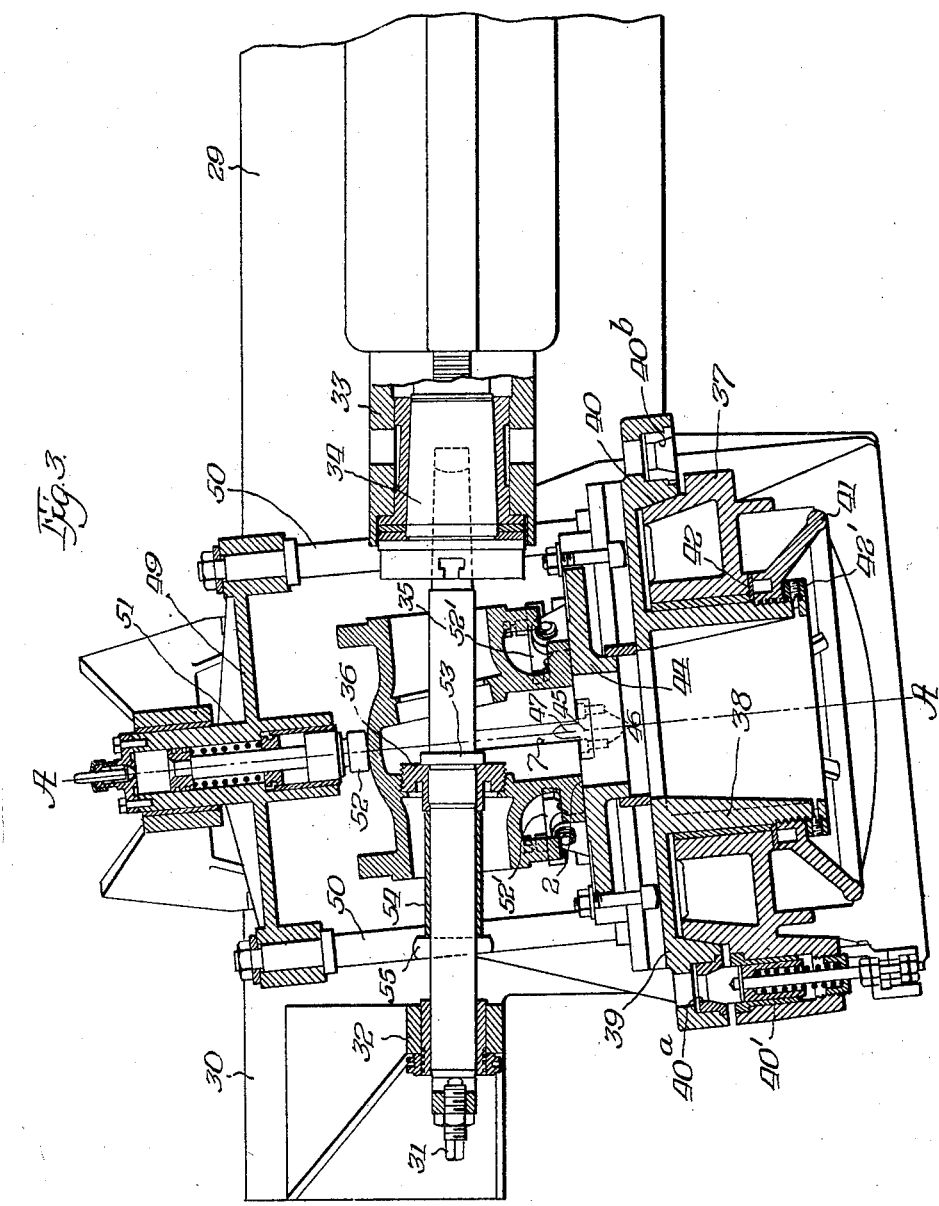

Dec. 8, 1931.  V. E. FLODIN  1,835,289
GATE VALVE
Original Filed April 9, 1928  4 Sheets-Sheet 4
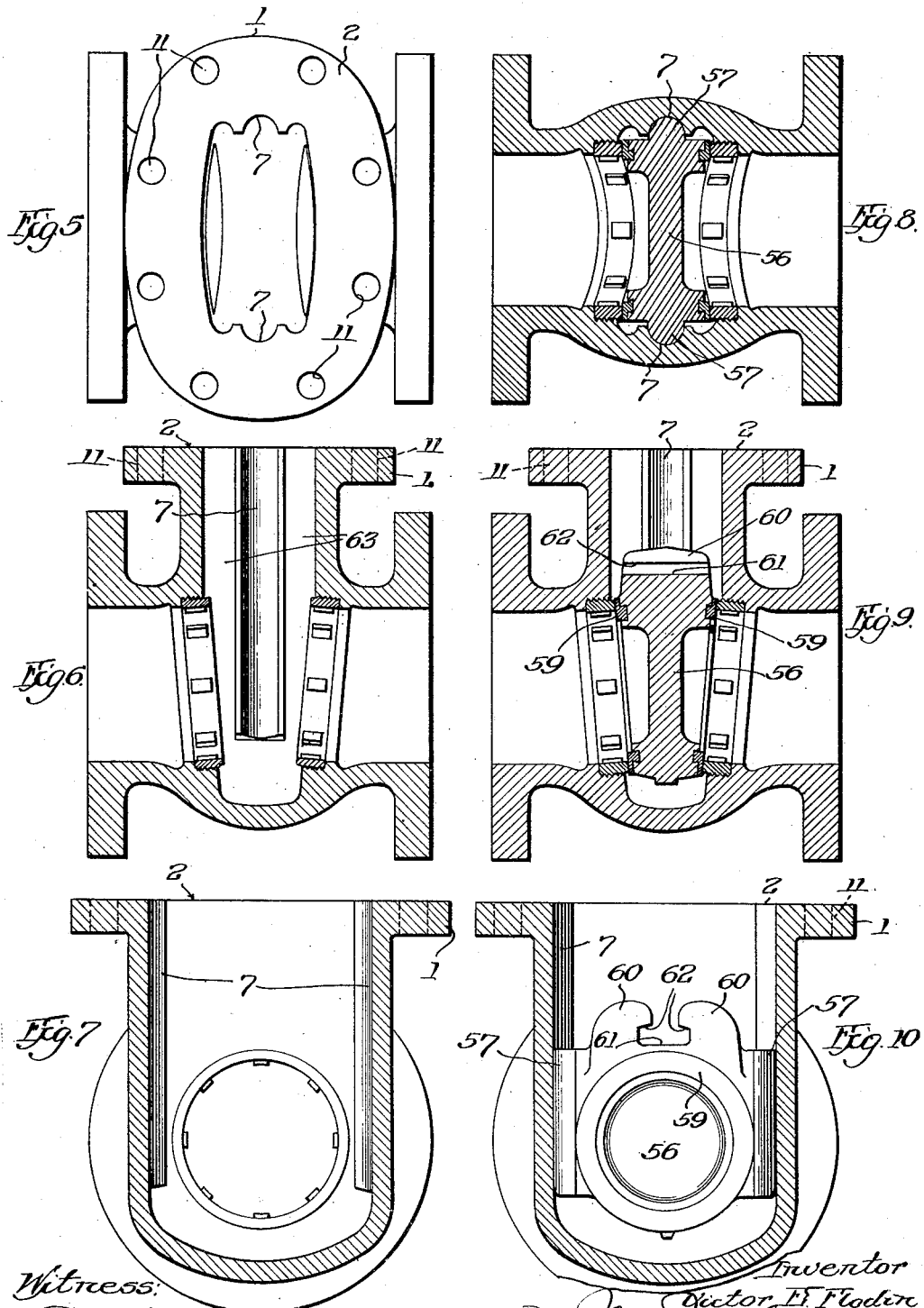

Patented Dec. 8, 1931

1,835,289

UNITED STATES PATENT OFFICE

VICTOR E. FLODIN, OF OAK PARK, ILLINOIS, ASSIGNOR TO CRANE CO., OF CHICAGO, ILLINOIS, A CORPORATION OF ILLINOIS

GATE VALVE

Application filed April 9, 1928, Serial No. 268,484. Renewed October 19, 1931.

This invention relates to gate valves and their manufacture and, more specifically, to a peculiar gate valve the novelties of the physical character of which lie primarily in a unique construction of the valve parts, particularly the cooperative guides on the body and gate, the cooperative seats on the body and gate, the body, and the gate.

The ordinary gate valve body, whether cast, forged or otherwise formed, is usually provided with one or more guide ribs, slots or grooves on each side, for guiding the gate in its movements to and from its seating position. The gate itself, for such purpose, is likewise provided with a cooperative rib, ribs, groove or grooves on each side, as the case may be.

So far as I am aware no attempt of a successful nature has been made to fit the guides on the gate and body to or with one another in an extremely accurate manner for several reasons, but principally because of the difficulty and expense of the necessary machining operations and the mating of parts thereafter. On the contrary, the almost invariable practice has been to machine the guides or guide surfaces on the gate or disc only generally leaving the cooperative surfaces on the body rough, and at the same time allowing sufficient clearance between the guides on the gate and body as to permit raising and lowering of the gate without rubbing engagement of the cooperative guide surfaces.

In most cases a single guide rib is placed on each side of the body and one of the guide ribs is made considerably wider laterally than the other so that the gate, which has its guide slots milled out proportionately to receive the ribs, can be inserted in the valve in only one way, although manufacturers sometimes disposed the guide ribs in the body unsymmetrically to obtain the same result, namely, that the gate will fit in the body in but one position.

Then too, there are instances, even where guide ribs have been symmetrically disposed, the methods of machining have not permitted reversibility in seating the gate or disc, due to inherent inaccuracies heretofore insurmountable. Thus, for example, when repair gates or discs have been ordered, it has been necessary in most instances also to have the body as well as the gate on hand in order to guide it properly, and the downstream face and upstream face (pressure side) of the gate or disc must necessarily match with the respective faces of the body.

However, with such construction, wear on the parts is inevitably considerable, and therefore extremely objectionable. With any difference of pressures on opposite sides of the gate, the gate will be forced toward the side of least pressure during its opening and closing movements, which will in turn cause rubbing of the seat surfaces and guide surfaces and the rapid wearing away of both whether the guide surfaces are machined or not. Then too, when the clearance between the guide surfaces is greater than say 0.01 of an inch on a side, (it is usually about 0.05 of an inch) it not infrequently happens that "binding", "galling", "chattering" and "hammering" of the gate in the body results, which tends materially to shorten the life of this type of valve, causing it to leak and become unservicable.

There is another undesirable result encountered with prior gate valve constructions. It has been practically impossible to standardize the valves so that their parts, their bodies, gates, bonnets etc. may be interchanged without difficult and expensive machining, fitting and adjusting of such parts each time a substitution is effected. As is well known, even under the best production methods practiced today, a great amount of time and hand labor must be spent in fitting a particular gate in a particular body so that a perfect and satisfactory fit is had between the seat surfaces of the gate and the corresponding seat surfaces on the body seat rings.

It very seldom happens however that, when the fitting of the gate in the body has been completed, and the construction is such as to permit it, the gate may be swung around 180° on its vertical axis and replaced in the body or replaced therein with a proper working contact of the cooperative seat surfaces, and there is even less chance that a gate will fit in any position with a proper working contact against the body ring seat surfaces in any other body than the one in which it has been initially fitted.

The net result of manufacturing gate valves in this manner has been to increase their cost, well beyond what their cost should be, in order to absorb the costs of waste material, defective parts, etc., as well as to pay for a terrific amount of labor rendered necessary. Besides, each valve when finished is a "handmade specialty", so to speak, and whenever such valve or one of its working parts becomes worn and must be renewed or replaced, it usually becomes necessary to remove the whole valve from the line and refit the worn part or fit a new part to the other parts, either on the premises or at the valve manufacturer's factory. In either case great inconvenience, delay and expense, all of which might be saved if the valves and their parts could be standardized and made interchangeable, are often incurred.

Therefore, one of the principal objects of my invention is to provide a gate valve, the primary working parts, such as the bonnets, gates, seats and bodies of which will be interchangeable respectively with other bonnets, gates, seats, and bodies of the same type and size, the while maintaining an accurate, satisfactory and proper fit between their co-operating parts.

Other objects of the invention including the provision of a novel type of valve gate and unique guides and guideways on the gate and in the body, as well as the advantages and uses of the invention and the functions and operation of the parts of the preferred form illustrated and described herein, will be or should become fully appreciated after reading and studying the following description and claims and after viewing the drawings, in which:

Fig. 1 is a perspective view of a valve body casting after the bonnet face has been finished in the first step of my method and showing a templet or fixture about to be placed on the body in preparation for the second major step of my process.

Fig. 2 is a sectional elevation through a portion of a slot milling machine showing the milling cutters approximately at the end of their travel downwardly into a valve body held in position for such operation with a jig or fixture also in sectional elevation. The milling operation is the third operation of primary importance.

Fig. 3 is a sectional elevation through a jig or fixture, a valve body and part of a boring machine showing the manner in which the valve body is positioned and secured for boring out and tapping the body seat ring recesses in the performance of the fourth primary important step of my process, which step may in turn be divided into two steps, (a) the boring and (b) the tapping.

Fig. 4 is a sectional view through a positioning templet used in connection with the jig or fixture illustrated in Fig. 3.

Figs. 5, 6 and 7 are, respectively, a top plan view, a vertical sectional view along the line of flow and a vertical sectional view transverse of the line of flow of a valve body completely prepared by my method, and Figs. 8, 9 and 10 are, respectively, a transverse section, a vertical section through the ports and a vertical section transverse of the ports of the valve body shown in Figs. 4, 5 and 6 with a valve gate constructed in accordance with the invention in position therein.

The method I have devised for the manufacture of gate valves of the character described and which will be given for a better understanding of the structure of my valve consists of approximately ten, more or less, important steps or operations of which approximately four are of primary importance, the balance being more or less secondary. For convenience, the various steps will be taken up in the order in which they are performed starting with the body after it has been cast and sand blasted or cleaned, forged or otherwise formed or prepared and ending with the valve gate and its preparation for incorporation in the body. The invention will be illustrated and described in connection with a two-ported valve having its ports oppositely positioned and adapted to be closed by a gate of the wedge type presenting two closure faces, but it should be understood at the outset that the invention is applicable to a valve having a greater number of ports and a gate having more than two closure or seat faces whether of the wedge type or some other type.

*The body*

1. The valve body constructed in accordance with my invention is to be provided with diametrically opposite guide slots or guideways extending from the top or adjacent the top of the valve chamber to a place at or adjacent the bottom thereof, all of which is to be determined by the length of the guides or ribs on the gate, the extent of travel of the gate, the size and proportions of the valve body and gate etc. The body is initially cast, forged, or otherwise formed in the usual manner with the guide slots or guideways roughed out to oversize dimensions to permit finishing by machining to the proper or final dimension desired. After sand blasting or otherwise cleaning, the body is mounted in a lathe for the purpose of machining the bonnet abutment or connecting face or bonnet flange face, as it may be termed. This face must be machined off so that the plane thereof will lie at a predetermined angle with respect to one or more planes of symmetry of parts of the interior of the body or to the axis of the body along which the valve gate will move. Generally and in the present instance, the plane of this surface will lie perpendicular to the axis of the body or valve chamber. Thus any two bodies of the same type and size will have similar bonnet abutment faces disposed in the same predetermined relation to other similar parts of those bodies.

The interior of the valve body illustrated is to be made symmetric insofar as guideways and seats are concerned with respect to a plane to which the line of flow is perpendicular. Likewise the gate for cooperation with the seats and guideways of the body is to be made symmetric insofar as its seat surfaces and guides are concerned with respect to the same plane to which the line of flow is perpendicular. The plane to which reference is made here is that plane which contains the axis of the valve chamber.

2. The next step is illustrated in Fig. 1 and is for the purpose of locating and drilling the bonnet connection flange bolt holes in predetermined position and direction with respect to the approximate axes of the rough guideways. The finished face or surface of the bonnet connection flange is designated 2 and against this surface the finished under surface of a templet 3 is adapted to be positioned. The templet 3 has a pair of positioning plugs or pins 4 and 5. The plug 4 is rigidly and solidly connected in the templet at one end and provided with a cylindrical portion 6 at its other end approximately of the radius of curvature of one of the rough slots 7 in the body, while the plug 5 is of the spring pressed plunger type adapted to be raised by handle 8 against the action of a spring not shown and to be forced into the opposite rough groove or guideway 7. For this latter purpose, the pin end 9 is provided with a truncated conical surface 10 so that when the templet is in place the pin 5 may be forced or wedged downwardly into the opposite slot 7 to lock the templet on to the body flange in proper position.

The body with the templet in place is then held in a suitable jig or fixture, while the several flange bolt holes, which are indicated at 11 in dotted lines in Fig. 1 and full lines in other figures, are drilled through the apertures 12 of the templet. In this manner the position of each bolt hole in the bonnet connection flange of the body is located or positioned in predetermined position with respect to the axis or axes of the guideways 7 and with respect to the center line of the body or valve chamber, a plane of symmetry containing the axes of the guideways to which the line of flow is perpendicular, and to a plane of symmetry perpendicular to the first plane.

3. The next important step or group of steps is or are performed for the purpose of finishing the guideways or guide slots in the body. The body is now clamped and tightly held in a jig, such as that illustrated in Fig. 2, with the finished bonnet connection face or surface against a templet having a positioning shoulder, surface or face and carried by the milling machine, while positioning plugs carried by the templet fit in two substantially opposite bolt holes in the flange and center or position the body and guide slots with respect to the axes of movement and rotation of the milling cutters which are operated simultaneously to cut the parallel slots or guide grooves in the body. The depth of the cut, that is, its length, is determined in any suitable manner and upon completion of this milling operation the body is ready for the next and succeeding operation.

The jig or fixture used in this slot milling operation and the essential portion of the milling machine is illustrated in Fig. 2 and will be briefly described herein, although both jig and cutter head arrangement are described and claimed in my copending application, Serial No. 268,485, filed April 9, 1928.

The jig or fixture comprises a box open at its ends and top and includes a base 13 integral with which are sides 14 (one shown) in spaced relation. At the top of each side is a narrow but inwardly projecting plate 15 so arranged that the valve body through its bonnet connection flange 1 may be temporarily supported thereon when it is slid in from the left hand end of the jig, as viewed in Fig. 2. The distance between the inner edges of the plate 15 is, of course, sufficient to clear the sides of the body. Secured to the sides 14 of the jig at each end of each side and opposite one another are brackets 16 (two only shown) between pairs of which guide bars 17 are rigidly secured. On the guide bars heavy truss braces 18 are slidably mounted for movement toward and from one another and each is provided with a shoulder adapted to snugly fit over one side of each of the positioning templets 19 forming part of the milling machine head.

The templet 19, which is provided with pins 20 (not shown) at opposite sides in positions to engage in corresponding bolt holes 11 in the bonnet connection flange with negligible if any appreciable clearance, is also provided with central apertures 21 through which the milling cutter heads proper descend and rise. Rods 22 pass through apertures 23 in a plate 24 and at their upper ends are provided with adjustable abutment nuts 25 behind which lock nuts 26 are secured and at their lower ends are threadedly secured to the plate 19, as shown at 26. The plate 24 is attached to the head of the machine and generally designated 27 which may be raised and lowered by any suitable mechanism, well known in the art. As the head rises, it will carry the plate 24 upwardly away from the templet 19 for a predetermined distance, dependent upon the setting of the abutment nuts 25, and after engagement with the nuts 25, its continued upward movement will raise the templet 19 together with the parts secured thereto, as will hereinafter be described.

On the base 13 of the jig, a screw jack, generally designated 23′ and operated from an accessible place by a shaft 23″ in any manner desired, serves to raise and press the valve body upwardly against the templet 19 when the body is in position and when the truss braces 18 and their shoulders engage corresponding shoulders or surfaces formed on opposite sides of the templet 19. The valve body is thus held rigidly and securely in predetermined position with respect to the milling cutters 24′. The milling cutters 24′ are carried by the vertically reciprocal milling or drilling machine head 27, including the guide plate 24 and are secured against any appreciable bending or "give" in any direction from the straight line along which they are designed to operate by means of extended bearing members 25′ which are screwed in suitable bushings 25″ in turn secured to the plate 24. The templet 19 is provided with a post or extension 27′, intermediate apertures 21, projecting from the bottom side thereof. Longitudinally of this post 27′ on each side thereof in line with the apertures 21 are provided guideways 27″ along which the extended bearing members 25′ carrying the milling cutters 24′ are adapted to travel. The extended bearing members are substantially square in cross section and the guideways 27″ are arranged similarly, to fit snugly.

It will thus be apparent when a valve body is to be positioned in the jig, the head 27 is raised, sliding the milling cutters 24′ together with their extending bearings vertically upward in the guideways 27″ until the plate 24 engages with the abutment nuts 25 whereupon continued upward movement of the head also raises the templet 19 and its associated parts. The guideways and extended bearings insure that the milling cutters as they cut downward into the valve body, move in a straight line without wobbling, bending or giving in any direction. Holding the cutter shafts in proper alignment and position relative to one another, to the templet 19, and thus to the valve body during the milling operation, results in properly finished guide grooves symmetrical with respect to one another and to any plane through the valve body, and in grooves, the axes of which are absolutely parallel with one another throughout their length.

The cutters are, of course, simultaneously rotated by mechanism not shown and as the milling machine head descends, the body having been positioned so that the approximate centers of curvature of the guideways or guide slots or the axis of these slots, as they may be termed, are co-extensive with the axes of the rotation of the cutter, the guide slots or guideways will be milled or machined out exactly parallel with one another and with the center line of the valve chamber, and in predetermined angular relation and position with respect to the bonnet connection surface 2 and the centers of the bolt holes 11.

4. During the next operation the body seat ring recesses are bored out or finished and tapped symmetrically with respect to the aforesaid plane to which the line of flow is perpendicular and also with respect to a plane perpendicular to the said plane along a line equi-distant from the axes of curvature of the milled slots or guideways, in this case, perpendicular to the first said plane along the center line of the body, of course, assuming that the previous operations have been accurately performed. This is accomplished by determining or gauging and setting the position of the boring or finishing tool and taps, that is, the positions of their axes of rotation, from the bonnet connection surface and from the axial centers of the milled slots or guideways of the body.

The apparatus used for carrying out this step of the process is not broadly new, but for efficient and effective operation has, as is illustrated in Fig. 3, been somewhat modified. In this figure most of the boring machine operating mechanism has been broken away, leaving only the quill, boring bar and limit stop which are the parts necessarily involved in a description of this step of the process. For convenience the parts of the boring machine illustrated and the parts of the jig or fixture in which the valve body is mounted will be described first, leaving a description of their operation, and the manner in which the valve is mounted for operation to the last.

A part of the frame of the boring mill or machine is indicated at 29 and is extended beyond the jig or fixture to provide a part 30 on which an adjustable limit stop 31 and a bearing 32 are mounted. A quill 33 retractively mounted on the frame 29 carries a spindle 34 rotatable therein. The spindle 34 is adapted to removably receive one end of a boring bar 35 which at its opposite end is reciprocably and rotatably mounted in the bearing 32. The boring bar in the machine illustrated may be moved or fed to the left under the influence of a weight or by other means, but should be so arranged that when its left-hand end contacts with the limit stop 31 further movement toward the left will be stopped automatically whether or not rotation of the bar is also stopped. However when using the boring bar to carry a thread cutting tap, a second limit stop (not shown) one part of which is carried by the spindle, not only stops the advance of the bar, but its rotation as well.

The jig or fixture is suitably supported by a base or bed frame member (not shown) but which is a part of the frame 29, upon which a supporting frame 37 is rigidly mounted. The center of this supporting frame 37 is hollow to receive a hollow pivot portion 38 of a rotatable member 39 which is supported from and upon the supporting frame 37 by interengaging circumferentially tapered surfaces 40 formed on the member 39 and frame 37. The axis of the jig designated A—A in Fig. 3 is inclined to the vertical, depending upon the angular relationship of the axes of the seat ring recesses to be formed in the body and the plane of symmetry through the body to which the line of flow is perpendicular or the center line of the valve chamber. The axes A—A may be adjustably inclined by mechanism not shown and the height of the turntable may likewise be adjusted in any suitable manner.

For the purpose of indexing the turntable into predetermined positions and for locating it in such positions, a handwheel 41 is threadedly connected with the pivot 38 and when rotated in one direction engages with a circular bearing plate 42 secured to the frame 37 and thereby serves to draw or wedge the tapered surfaces 40 tightly together, so that they become rigidly fixed relatively to one another. A seat ring 42' secured by a plurality of set screws to the bottom ends of the threads of the pivot 38 not only prevents the hand wheel from being turned off the pivot accidentally, but also serves to engage the handwheel when it is rotated in a direction to release the surfaces 40 from one another so that upon continued movement of the handwheel in this direction the rotatable member 39 may be swung or indexed around in a counterclockwise direction viewing the machine from the bottom. A spring pressed plunger mechanism, generally designated 40', carried by the supporting frame 37 is adapted to engage suitable sockets 40a and 40b, in this case spaced 180° from one another, to lock the rotatable member 39 in indexed position. When the plunger is depressed below one of the apertures 40a and 40b, movement of the handwheel 41 in an anticlockwise direction as above described will index the rotatable member around until the plunger is projected into the other aperture.

Mounted on the rotatable member 39 is a plate or templet 44, the upper surface of which is finished to provide a positioning surface against which the finished surface 2 of the valve bonnet connection flange is placed. This plate or templet 44 (see Fig. 4) is provided with blocks 45 positioned thereon by dowel pins 46 and removably secured thereto by cap screws 46'. Each block 45 carries a positioning pin 47, the outer surfaces 48 of which are semi-cylindrical and adapted to snugly fit within the finished guideways 7 of the body so as to position the body in predetermined position with respect to the rotatable member 39.

A frame 49 rigidly supported on a plurality of upright supports 50 rising from and supported by the member 39 carries a pneumatic cylinder generally designated 51, in such position that the piston plunger 52 may be brought down against the bottom of the valve body to clamp the same securely against the templet 44. Suitable controls are provided for admitting air to the base of the cylinder which is of the spring return type. Oil, water or other fluid may be used in the cylinder as will be obvious.

In operation, the axis A—A is predetermined and fixed. The valve body which is to have its seat ring recesses bored out and tapped is then mounted on the templet 44 and secured in position thereon by the pneumatic cylinder 51 and by a plurality of clamps 52' which are pivotally secured to the templet 44 and are brought to bear against the bottom side of the valve flange 1.

At this time the quill head 33 is retracted to the right sufficiently to permit the boring bar to be passed through the valve body, whereupon the spindle is brought up and the boring bar secured therein. As the boring bar is being passed through the valve body the boring cutter or tap, as the case may be, is thrust up through the center of the jig into the valve body and onto the end of the boring bar as it enters the valve chamber and abutted against a collar 53, while a sleeve 54 is placed about the bar behind the cutter or tap and used to hold the cutter or tap tightly against the shoulder 53 under the influence of a tapered cotter pin 55 which is passed through a slot in the bar.

Owing to the rigidity with which the operating parts are held during their operation and the rigidity with which the valve body is held in position during such operation, extreme accuracy in the boring and tapping of the body seat ring recesses is secured. When the boring bar has contacted with the limit stop 31, further effective operation of the cutters ceases and as soon as one body seat ring recess has been bored, the opposite seat ring recess is bored in exactly the same manner by merely removing the boring bar and cutter releasing the rotatable member 39 and swinging the latter with the valve body around 180° in an anti-clockwise direction.

After the seat ring recesses have been bored out, a tap is mounted on the boring bar in the same manner in which the cutter is mounted thereon, as will be understood, but when the tapping has progressed the desired amount in the recess, the other limit stop (not shown)

comes into operation, and not only stops the advance of the boring bar, but also its rotation. Mechanisms of this character are well known in the art and need not be described herein. The limit stop 31 is set, of course, to a predetermined position in order to determine the depth to which the boring of the body seat ring recesses is to progress and the other limit stop is likewise set to a predetermined position in order to determine the point at which the tapping is to cease. As will be understood, both recesses may first be bored out and thereafter tapped, if desired.

It will thus be apparent that the positions and angular relations of the seat ring recesses are determined with respect to the finished bonnet connection surface 2 and to the slots or guideways 7 and that in the embodiment of the valve illustrated, the angles of the positions of the seat ring recesses, the depth to which they are cut and the threading is symmetric with respect to a plane containing the axes of the guideways 7.

The body seat rings

5. All body seat rings are prepared alike, that is, in a similar manner for all valves of the same size, although the type of ring may be varied for particular purposes if desired, but if varied, may require a slightly different preparation, depending upon the circumstances. However, for each size and type of valve the diameter and depth of each ring must be determined in accordance with what is proper and correct for the depth of the seat ring recesses or ring positioning shoulders or abutments in the body so that the gates will fit properly without adjustment and any gate of a particular size and type may be used. A preferred method and an apparatus for preparing body seat rings for use in valves of the character and type described herein are disclosed and claimed in my copending application, Serial No. 268,487, filed April 9, 1928.

Briefly stated, the process described in my copending application, Serial No. 268,487, consists in threading the initially cast, forged or otherwise formed rings, longitudinally of their axes with external threads of the same pitch, diameter and character as the threads formed in the body seat recesses, thereafter, or, if desired, before the threading, cutting away the metal peripherally at the junctures of the external side and end faces of each ring to provide an external circumferential portion at each end which will be devoid of threads, and thereafter finishing the end faces of the rings in planes bearing predetermined angular relationships to one another and to the axis of the threads, in this case parallel to one another. The distance between the planes of the finished end surfaces of each ring, the angular relationship of the planes to one another and to the pitch or some other characteristic of the threads, such as the beginning and ending of a thread, is preferably secured by holding the threaded article, that is, the ring by the threads with the thread or threads beginning and/or ending in predetermined position or positions with respect to the tool adapted to finish the end surfaces and thereafter moving the tool relatively to such surface to effect the surface. Where, of course, the surface of the rings are parallel and the threads stop short of the edges, the necessity for machining the surfaces with respect to the beginning or ending of a thread is negligible.

This method and an apparatus by which it may be carried out are described and claimed in said application, Serial No. 268,487, and need not be dwelt upon to a greater extent herein.

After the body seat rings have been completed they are assembled in the seat ring recesses in the valve bodies and if the work has been properly done they will fit in the bodies with their seat surfaces in the exact positions in which they are desired. The steps of the process thus far disclosed, as well as those steps yet to be disclosed, give maximum accuracy, or, putting it in the other sense, a minimum of inaccuracy for a maximum production of interchangeable parts.

Gates

6a. Since the body is provided with guideways or guide slots the gate or some part attached to the gate must be provided with ribs or guides adapted to be fitted to and slide in the guideways or slots. Therefore, each gate, whether cast, forged or otherwise formed, is at the same time provided with a pair of guide ribs, one at each side. Such ribs must correspond in relative positions to the seat surfaces on the gate as the guideways or slots correspond in relative positions to the body seat ring seat surfaces in the body, and, for cooperation with the finished guideways or slots in the body, must likewise be completely finished along their bearing surfaces. The finishing may be done by any suitable process and mechanism.

Just as it is necessary to use extreme accuracy to carry out the steps of the method hereinbefore described and for accuracy such method was devised, so also is it necessary that the valve gates or discs themselves be carefully and accurately prepared, a proper regard being had to the finishing of the seating surfaces and guiding surfaces or guideways for guides of the gate so that both seats on the gate will seat simultaneously on the valve seats or seat rings in the body and have complete and uniform contact therewith circumferentially thereof. While it would be possible and perhaps practical first to finish the seat surfaces of the gate in predetermined angular relationship to one another and thereafter finish or machine the guide bearing surfaces or the guide surfaces of the guide ribs, as they may be termed, so that the axes thereof will lie in a plane containing the axis of movement of the gate and the line of intersection of the planes of the seat surfaces, I prefer to machine or finish the bearing surfaces of the guide ribs before machining or finishing the gate seat surfaces.

The machining of the guides, as before stated, may be done on any machine suitable for such purpose and as such machines are old and well known, no further reference to them will here be made. It should be noted, however, that in the preferred form, as illustrated particularly in Figs. 8 to 10 inclusive, the gate 56 has its guide ribs 57 completely machined across their width and along their length.

The surface of each rib along a transverse line is struck on an arc, the radius of which is substantially the same as the radius of curvature of the slots 7, so that the ribs will have a sliding contact in the guideways over substantially their whole length and width. The clearance between the ribs and guideways is very slight, so that a complete arcuate contact between the rib and its guideway is provided, and the gate, over a long period of wear, cannot and will not wobble, chatter, nor hammer in the body and score the seats. When the gate is raised or lowered in the body, it moves in an absolutely straight line perpendicular to the line of flow.

6b. The seat surfaces or the seats of the gate are next machined, ground or otherwise finished with the planes of such surfaces or seats in predetermined angular relationship to one another and to the axes of the guides 57. In the embodiment of the invention illustrated, the gate 56 is provided with special seat rings 59 which are inserted in circular recesses in the gate body in any suitable manner and the seat surfaces of these seats may be finished by using the machine described and claimed in my copending application, Serial No. 268,486, filed April 9, 1928.

As described in said copending application Serial No. 268,486, the gate is held by its guide ribs in such manner that first one side and then the other, that is, the seat surfaces may be presented to a tool for finishing the surfaces in the same predetermined relation with respect to a plane containing the lines of mean center of curvature, that is, the longitudinal axis of the ribs or guides. The surfacing tool is then relatively moved over one surface of the article in its predetermined relation thereto and after the first surface is finished the apparatus is so arranged that without repositioning the gate, the gate may be reversed and the opposite surface finished.

The angle at which the gate seat surfaces lie to one another, and of course, their dimensions and location, is determined by the angular relationships of the planes of the cooperative seat ring seat surfaces in the body, the dimensions, location and other specifications of such surfaces, so that when the gate is completed it may be placed in any body of its type and size and will accurately and closely fit therein. Gates properly made in accordance with the method thus far described will fit in any body of the same size and type likewise properly made without the necessity of any lapping or hand-fitting operations. In other words, the valve and its parts are made by machine fitting as distinguished from hand-fitting, as heretofore universally employed in the manufacture of this type of valve.

6c. The type of gate illustrated is provided with two lugs 60 at its top which project toward one another and are each undercut from side to side of the gate for the reception of a T head formed on the valve stem. In this construction, the bottom surface 61 lies in a plane perpendicular to the axes of the ribs 57, while the top surfaces 62 are bevelled off in opposite directions and their planes if projected make equal angles with the projection of the plane of the surface 61.

*The stem and bonnet*

7. Both of these parts are carefully manufactured for proper and accurate cooperation with the body and gate, as will be understood, but since their manufacture including their machining involves no particular difficulty and as it is not considered one of the important elements of this invention no detailed description thereof will be made herein. Of course, the surface on the bonnet which is to cooperate with the surface 2 of the bonnet connection flange on the body must be finished in a plane bearing a proper angular relationship and position to the center line of the stem bearing or the center line of the stuffing box etc. so that the stem and gate will not bind when assembled with the body. With the type of stem and gate connection illustrated and described, extreme accuracy in the construction of the bonnet and stem is not absolutely necessary, although desirable.

The procedure described under step or steps 2 above and the apparatus used in carrying out this step or steps may, perhaps, be used only for the manufacture of valve bodies having bonnet connection flanges. It may, however, sometimes be desirable to provide a screw bonnet instead of a flange. In such instances special thread cutting dies for cutting threads about the top of the valve body may be arranged. For this purpose the body may or may not be provided with a finished surface at the top end of the chamber the plane of which is perpendicular or at some other predetermined angle with respect to the center line, but it is necessary that the axis of the threading die be co-extensive with the axis of the body. A device satisfactory for this purpose may be readily constructed after the teaching of this specification by providing a die having aligning plugs similar to the plugs 4 and 5 of the templet 3 which are adapted to fit within the body guideways 7 symmetrically to center the same and having a relatively rotatable thread cutting die arranged about the part carrying the plugs or pins so as properly to cut the threads.

Then, during the subsequent operation of cutting or milling out the guideways or grooves in the body and boring out and threading the body seat ring recesses, the body may be positioned and held by a threaded chuck or collet engaging the threads thus prepared on the body. In this wise the threads on the body take the place and serve the purposes of the plane surface of the flange, the bolt holes etc. as should be clearly understood.

The valve body seat rings illustrated herein are provided with a series of internally projecting lugs by which the rings may be engaged by a suitable tool for screwing them into and out of their positions in a body. However, the body seat rings, if desired, may be provided with octagonal facets on their interior to facilitate screwing them into or out of the body. As will be understood, the device illustrated and described in my application Serial No. 268,487 may be used to finish the body rings of the character illustrated herein.

While I have shown and described what is at present a preferred form of valve and a preferred method by which it is constructed, it will be appreciated that many variations and modifications will suggest themselves to those skilled in the art and for such reason I desire to be limited only by the spirit of the invention and the scope of the appended claims.

I claim:

1. In a gate valve, a body having opposed guideways having guide surfaces transversely concave and a wedge-shaped gate having guides having transversely convex guide surfaces slidably engaged in said guideways, said guide surfaces and guideway surfaces being in substantial contact throughout their concave and convex portions.

2. In a gate valve, a body having opposed guideways having integral guide surfaces transversely concave and extending substantially the full distance of and parallel the lines of travel of a valve gate along opposite interior sides thereof, and a gate having guides having guide surfaces of transversely convex shape, said guides being of rectangular shape in longitudinal cross section and slidably engaged in said guideways, said concave and convex guide surfaces being in substantial contact throughout their areas.

3. In a gate valve, a body having inlet and outlet ports and a pair of concave guideways symmetrically disposed on opposite interior sides with respect to a plane through the body containing the center line of movement of a closure member in opening and closing one of said ports, and a wedge shaped closure member having transversely convex guides slidably engaged in said guideways, said concave and convex guide surfaces being in substantial contact throughout their areas.

4. In a gate valve, a body having concave guideways having guiding surfaces conforming to a part of a cylindrical surface, and a wedge shaped gate having guides having convexly curved bearing surfaces conforming to said guiding surfaces slidably mounted in said guideways, the radii of curvature of said guide bearing surfaces being substantially the same as the respective radii of curvature of said guiding surfaces, said bearing surfaces and guide surfaces being substantially in contact throughout their areas.

5. In a gate valve, a body having concave guideways having guiding surfaces conforming to a part of a cylindrical surface, a wedge shaped gate having guides having convexly curved bearing surfaces conforming to said guiding surfaces slidably mounted in said guideways, the radius of curvature of one of said guide bearing surfaces being substantially the same as the radius of curvature of the guiding surface of the guideway with which it is engaged, said concave guide surface and said convex bearing surface being substantially in contact throughout their areas and a valve stem loosely connected to said gate.

6. In a gate valve, a body having opposed guideways having guide surfaces transversely concave extending substantially the full distance of and parallel the lines of travel of a valve gate along opposite interior sides thereof, a wedge shaped gate having guides having guide surfaces of transversely convex shape, the radii of curvature of said guide bearing surfaces being substantially the same as the respective radii of curvature of said guiding surfaces, said concave and convex guide surfaces being substantially in contact throughout their areas and a valve stem loosely connected to said gate.

7. In a gate valve, a valve body having curved guide surfaces therein, a valve gate comprising a disc substantially wedge shaped in cross section and having a pair of guide ribs, the guide surfaces of which are curved laterally, said ribs extending parallel to one another and to the line of movement of the gate in the valve body and being in engagement with said curved guide surfaces, throughout substantially their entire area.

8. In a gate valve, a valve body having concaved guide surfaces therein, a valve gate comprising a wedge shaped disc having one of its wedge faces provided with a seat surface adapted to seat against a seat in the valve body, and a pair of guide ribs on opposite sides of said disc and symmetrically disposed with respect to their distances from the center line of movement of said gate when in the valve body, said ribs having laterally, convexly curved portions extending longitudinally from end to end of each and arranged to be engaged by the guide surfaces of said valve body throughout substantially their entire areas.

In witness of the foregoing I affix my signature.

VICTOR E. FLODIN.